No. 864,874. PATENTED SEPT. 3, 1907.
L. P. THOMPSON.
FLOOR SCRAPER.
APPLICATION FILED MAY 15, 1907.
2 SHEETS—SHEET 1.
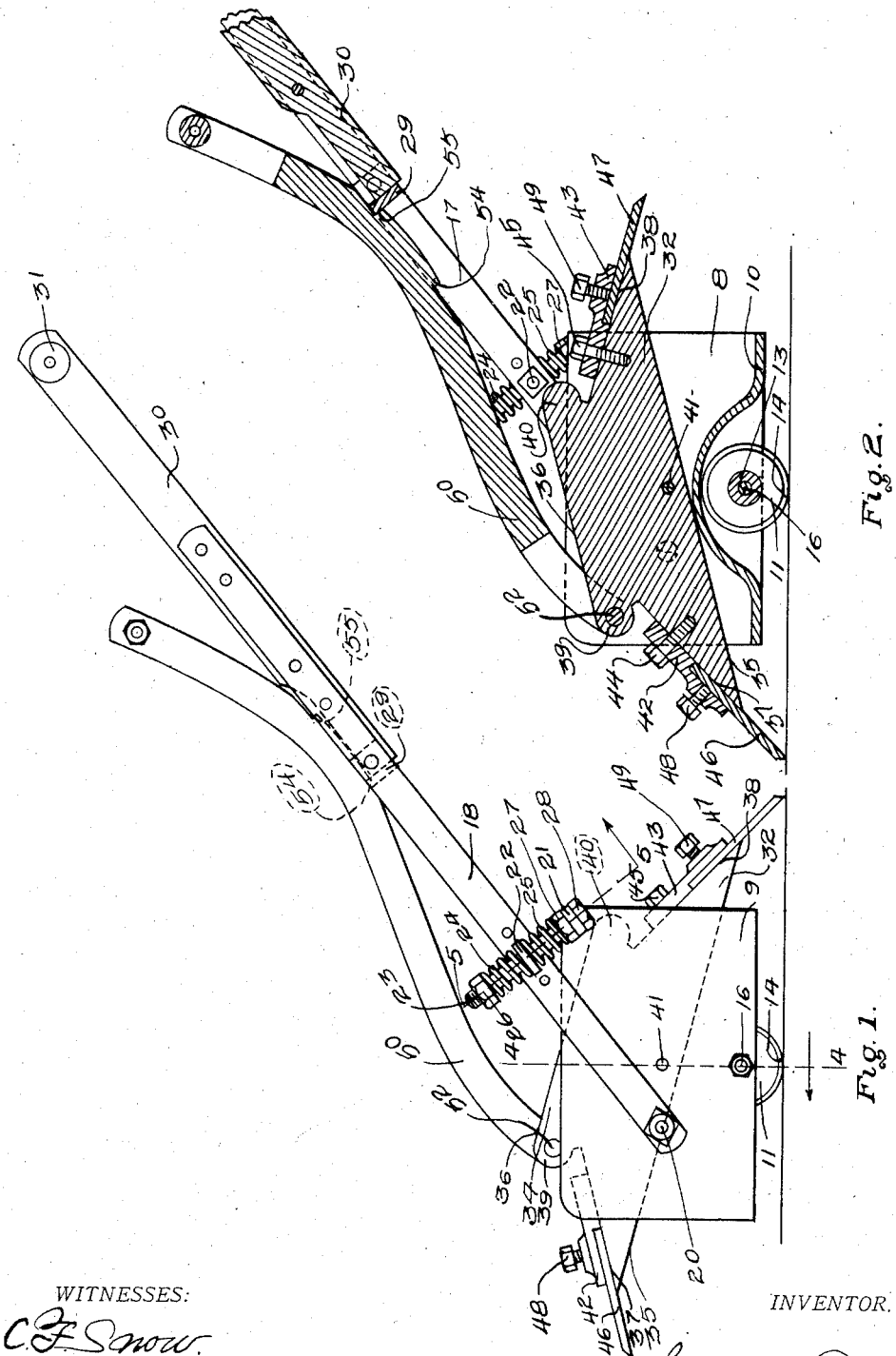
WITNESSES: INVENTOR.

No. 864,874.　　　　　　　　　　　　　　　　　PATENTED SEPT. 3, 1907.
L. P. THOMPSON.
FLOOR SCRAPER.
APPLICATION FILED MAY 15, 1907.

2 SHEETS—SHEET 2.

WITNESSES:　　　　　　　　　　　　　　　INVENTOR.
C. F. Snow　　　　　　　　　　　　　　Lewis P. Thompson
S. G. Wells.

UNITED STATES PATENT OFFICE.

LEWIS P. THOMPSON, OF MINNEAPOLIS, MINNESOTA.

FLOOR-SCRAPER.

No. 864,874.  Specification of Letters Patent.  Patented Sept. 3, 1907.

Application filed May 15, 1907. Serial No. 373,871.

*To all whom it may concern:*

Be it known that I, LEWIS P. THOMPSON, a citizen of the United States, residing at Minneapolis, Minnesota, have invented a new and useful Floor-Scraper, of which the following is a specification.

My object is to provide a machine for smoothing wood floors and my invention consists of the novel features herein shown, described and claimed.

Figure 4:
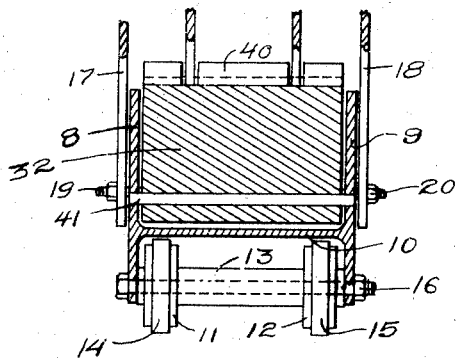
Figure 5:
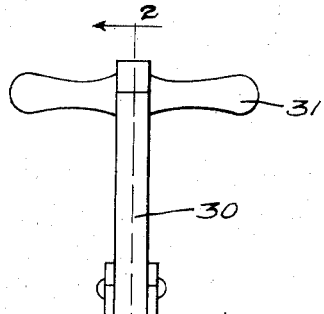
Figures 3, 6:
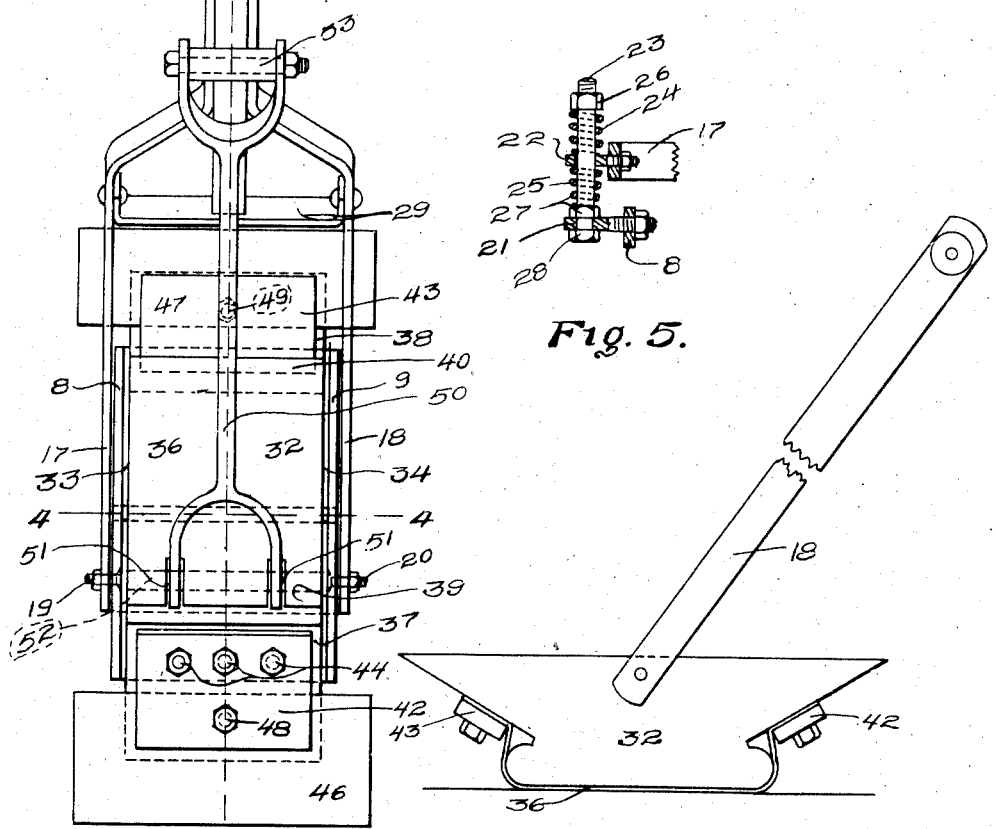

In the drawings: Figure 1 is a side elevation of a floor scraper embodying the principles of my invention. Fig. 2 is a sectional elevation on a plane parallel with Fig. 1 and taken on the line 2—2 of Fig. 3. Fig. 3 is a top plan view. Fig. 4 is a cross section taken on the line 4—4 of Figs. 1 and 3. Fig. 5 is a sectional detail on the line 5—5 of Fig. 1. Fig. 6 is a side elevation of a sand papering machine constructed by using the head and handle of the floor scraper.

Referring to the drawings in detail, the rectangular side plates 8 and 9 are formed integral with the web 10, so as to hold the plates vertical and parallel. The wheels 11 and 12 are formed integral with the collar 13, and rubber tires 14 and 15 are placed upon the wheels. The wheels are placed between the lower sides of the plates 8 and 9, near their longitudinal centers, and a bolt 16 is placed through the plates and through the collar, so as to make a two-wheeled truck balanced in the middle. The web 10 is curved upwardly at its center to make room for the wheels under the web.

The handle bars 17 and 18 are secured against the outer faces of the plates 8 and 9 by the pivot bolts 19 and 20, said handle bars extending upwardly and forwardly at an angle of about 45 degrees. Screw-eyes 21 are secured to the upper front corners of the plates 8 and 9 and extend outwardly. Screw-eyes 22 extend outwardly from the handle bars 17 and 18 into the plane of the screw-eyes 21. Screw threaded bolts 23 are placed through the screw eyes 22 and springs 24 and 25 are placed one upon each side of each screw eye 22, and nuts 26 and 27 are placed upon the ends of the bolts. The lower ends of the bolts 23 are inserted through the screw eyes 21 and nuts 28 applied, so as to form a yielding connection between the handle bars 17 and 18 and the side plates 8 and 9. A locking bar 29 is secured between the upper parts of the bars 17 and 18. The upper ends of the handle bars are brought towards each other and the wood extension bar 30 is adjustably secured between said ends, there being handles 31 at the outer end of said piece, so that the length of the handle may be changed.

The scraper head 32 is a solid casting having vertical parallel side faces 33 and 34, a flat lower face 35, a flat upper face 36, and the clamping end faces 37 and 38, said end faces being at angles of about 30 degrees relative to the lower face 35, and there being beads 39 and 40 at the end of the upper face 36. The head thus constructed is placed between the side plates 8 and 9 upon the pivot 41. The recessed clamping plates 42 and 43 are secured to the clamping faces 37 and 38 by bolts 44 and 45 and the knives 46 and 47 are placed in position and held by set screws 48 and 49. The tilting handle bar 50 is divided at its lower end and inserted into transverse slots 51 in the head 39 and secured by the pivot 52. The upper end of the handle bar is divided to receive the handle 53 and just below the handle 53 the handle bar is bowed downwardly to contact with the locking bar 29, there being notches to form the teeth 54 and 55 to engage the locking bar, so that when the knife 46 is to be used the tooth 55 is engaged with the locking bar and when the knife 47 is to be used the handle 53 is elevated, the head tilted and the tooth 54 engaged with the locking bar 29.

By taking the handle 53 in one hand and the handle 31 in the other hand and manipulating the handle 53 to tilt the head back and forth, the machine will scrape first one way and then the other. The knives may be set to extend sidewise beyond the side of the machine so as to scrape close to a wall. By the use of this machine, a person can do more and better work than in the old way.

After the floor has been scraped, it may be sand papered by applying the main handle to the head bottom side up and applying sand paper to the face 36, the ends of the sand paper being placed under the clamps 42 and 43.

I claim:

1. In a floor scraper, a carrying frame; a scraper head pivotally mounted in the frame; knives upon each end of the scraper head; a handle connected to the frame; a handle connected to the scraper head; and connections between the two handles, so as to tip the scraper head back and forth, bringing either knife into action.

2. In a floor scraper, a carrying frame; a scraper head pivotally mounted on the frame; knives upon each end of the scraper head; a handle yieldingly and adjustably connected to the frame; a handle connected to the scraper head; and devices for connecting the two handles rigidly together at different points, so as to tip the scraper head first one way and then the other and bring either knife into action.

LEWIS P. THOMPSON.

Witnesses:
C. F. SNOW,
S. G. WELLS.